(12) United States Patent
Wang et al.

(10) Patent No.: US 12,717,143 B2
(45) Date of Patent: Aug. 25, 2026

(54) NEAR-EYE DISPLAY DEVICE COMPRISING A PLURALITY OF ARRAYS OF MICROLENSES EACH HAVING A SURFACE THAT IS OFF-AXIS ASYMMETRIC RELATIVE TO A GEOMETRIC CENTER OF THE SURFACE

(71) Applicant: Industrial Technology Research Institute, Hsinchu (TW)

(72) Inventors: Chy-Lin Wang, Hsinchu County (TW); Chia-Hsin Chao, Hsinchu County (TW); Hsueh-Chih Chang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 278 days.

(21) Appl. No.: 18/422,009

(22) Filed: Jan. 25, 2024

(65) Prior Publication Data

US 2024/0255759 A1 Aug. 1, 2024

Related U.S. Application Data

(60) Provisional application No. 63/482,302, filed on Jan. 31, 2023.

(30) Foreign Application Priority Data

Dec. 27, 2023 (TW) ................................ 112151077

(51) Int. Cl.
*G02B 27/01* (2006.01)

(52) U.S. Cl.
CPC .. *G02B 27/0172* (2013.01); *G02B 2027/0123* (2013.01)

(58) Field of Classification Search
None
See application file for complete search history.

(56) References Cited

U.S. PATENT DOCUMENTS 10,634,912 B2 4/2020 Blum et al.
2019/0310481 A1* 10/2019 Blum ................. G02B 27/0172
(Continued)

FOREIGN PATENT DOCUMENTS

CN 112987295 6/2021
CN 108375840 7/2021
(Continued)

OTHER PUBLICATIONS

"Office Action of Taiwan Counterpart Application", issued on Dec. 27, 2024, p. 1-p. 8.

(Continued)

*Primary Examiner* — Paul C Lee
(74) *Attorney, Agent, or Firm* — JCIPRNET

(57) ABSTRACT

A near-eye display device includes a first light transmission substrate, a plurality of arrays of display units, a second light transmission substrate, and a plurality of arrays of optical elements. The arrays of display units are configured on the first light transmission substrate. An interval between two adjacent display units is a light transmission region. The second light transmission substrate is configured in a different layer from the first light transmission substrate in a stacking direction. The arrays of optical elements are configured on the second light transmission substrate. An interval between two adjacent optical elements is a light transmission region. Each display unit has a one-to-one correspondence with the optical element in the stacking direction.

14 Claims, 13 Drawing Sheets

(56) References Cited

U.S. PATENT DOCUMENTS

2021/0063766 A1 3/2021 Karafin et al.
2021/0181384 A1* 6/2021 Ling .................... G02B 27/017
2021/0405255 A1 12/2021 Kress et al.
2022/0110522 A1 4/2022 Hu et al.
2023/0101633 A1 3/2023 Shi et al.
2023/0221556 A1 7/2023 Benitez et al.

FOREIGN PATENT DOCUMENTS

| | | |
|---|---|---|
| CN | 114280793 | 4/2022 |
| TW | I688790 | 3/2020 |
| TW | I717602 | 2/2021 |
| TW | I728605 | 5/2021 |
| TW | 202301765 | 1/2023 |

OTHER PUBLICATIONS

Svetlana Samoilova et al., "Development of See-Rhrough Near-Eye Optical Module for AR Eyewear", Proceedings of SPIE, vol. 12450, Mar. 15, 2023, pp. 1-9.
Svetlana Samoilova et al., "NewSight Reality Inc. (NSR) Novel Transparent Optical Module for Augmented Reality Eyewear", Proceedings of SPIE, vol. 11062, Jun. 21, 2019, pp. 1-8.
"Office Action of Taiwan Counterpart Application", issued on Feb. 26, 2026, p. 1-p. 9.

* cited by examiner

NEAR-EYE DISPLAY DEVICE COMPRISING A PLURALITY OF ARRAYS OF MICROLENSES EACH HAVING A SURFACE THAT IS OFF-AXIS ASYMMETRIC RELATIVE TO A GEOMETRIC CENTER OF THE SURFACE

CROSS-REFERENCE TO RELATED APPLICATION

This application claims the priority benefit of U.S. provisional application Ser. No. 63/482,302, filed on Jan. 31, 2023, and Taiwan application serial no. 112151077, filed on Dec. 27, 2023. The entirety of each of the above-mentioned patent applications is hereby incorporated by reference herein and made a part of this specification.

TECHNICAL FIELD

The disclosure relates to a display device, and in particular relates to a near-eye display device.

BACKGROUND

Near-eye display devices worn in front of the human eye require display requirements such as high image quality, high pixel density, high update rate, and wide field of view to provide users with a better wearing experience. In Augmented Reality (AR) technology, there is a need to find an effective way to seamlessly blend the real environment with virtual images.

SUMMARY

The disclosure provides a near-eye display device, which may provide a complete and clear virtual image, maximize an effective light transmission region for visualizing a real environment, and seamlessly blend the real environment with the virtual image.

According to an embodiment of the disclosure, a near-eye display device is provided, which includes a first light transmission substrate, a plurality of arrays of display units, a second light transmission substrate, and a plurality of arrays of optical elements. The arrays of display units are configured on the first light transmission substrate. An interval between two adjacent display units is a light transmission region. The second light transmission substrate is configured in a different layer from the first light transmission substrate in a stacking direction. The arrays of optical elements are configured on the second light transmission substrate. An interval between two adjacent optical elements is a light transmission region. Each display unit has a one-to-one correspondence with the optical element in the stacking direction.

Based on the above, the near-eye display device provided by the embodiment of the disclosure may maximize an effective light transmission area on the premise of providing a complete and clear image.

In order to make the above-mentioned features and advantages of the disclosure clearer and easier to understand, the following embodiments are given and described in details with accompanying drawings as follows.

DETAILED DESCRIPTION OF DISCLOSED EMBODIMENTS

Figure 1A:
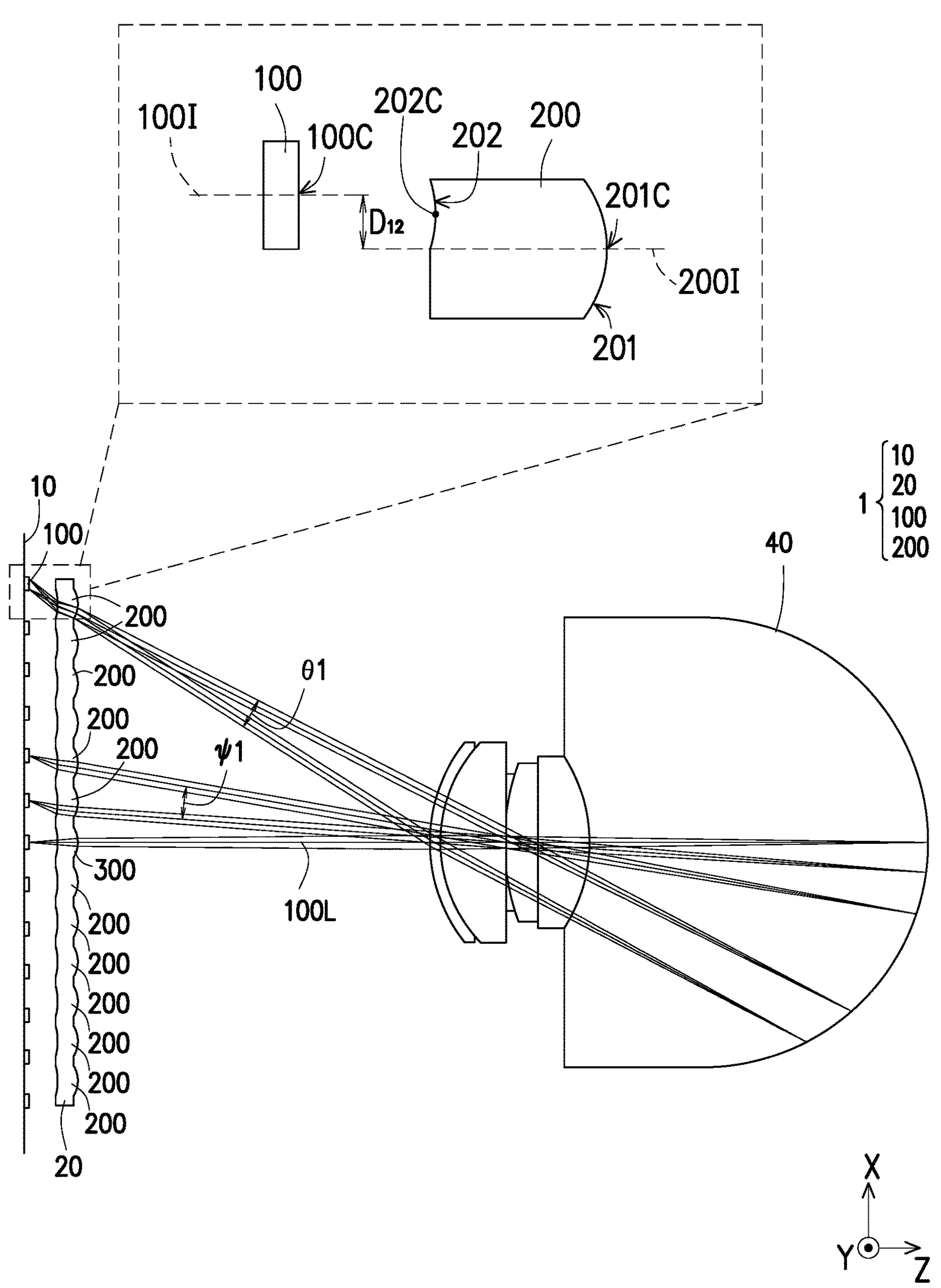
FIG. 1A is a schematic view of a near-eye display device according to an embodiment of the disclosure.

Near-eye display devices apply display technologies such as augmented reality (AR), mixed reality (MR), and extended reality (XR) to present virtual information (such as images, pictures, audio, 3D models, messages, etc.) within a user's line of sight range. Currently, the near-eye display devices include display devices such as head mounted displays (HMDs) and electronic viewfinders (EVFs). The display devices include thin film transistor liquid crystal displays (TFT-LCDs), active-matrix organic light-emitting diodes, liquid crystal on silicon (LCoS), organic light-emitting diode on CMOS (OLEDoS), digital light processing (DLP), and micro LEDs.

Taking the augmented reality technology as an example, the augmented reality combines the virtual information (such as images, pictures, audio, 3D models, messages, etc.) with the real environment through smartphones, tablets, smart glasses, smart TVs, heads-up displays, etc. In other words, the augmented reality technology may project a virtual image onto a light transmission substrate, so that the user can interact with the virtual image or view the virtual message, such as in a usage scenario where the user wears the smart glasses.

According to an embodiment, the near-eye display device may be a wearable device such as smart glasses, which uses a combination of a double-sided non-coaxial design array of optical elements (such as microlens arrays, metalens arrays, etc.), an array of island-shaped displays (display units 100), and a light transmission substrate. The array of optical elements (such as the microlens arrays, the metalens arrays, etc.), the array of island-shaped displays (the display units 100), and the light transmission substrate are each configured in different layers in a stacking direction. Each optical element follows each island-shaped display (e.g., a one-to-one correspondence) and is spaced apart from each other. In addition, since a center included angle between two adjacent island-shaped displays extends from a center to an intersection point, a wide field of view (FOV) of the optical element is also the same as the center included angle. The wide field of view of the optical element may be within 2 to 10 degrees. That is to say, the smart glasses applying the augmented reality technology present the virtual image on the light transmission substrate through the optical elements and the island-shaped displays. When the user wears the smart glasses, the line of sight of the user may penetrate the virtual image to see a clear real scene of the environment, and the virtual image seen by the user is a continuous spliced image.

In the embodiment, the near-eye display device includes at least two light transmission substrates. One is a first light transmission substrate, and another is a second light transmission substrate. Both of them are configured in different layers in a stacking direction. The first light transmission substrate includes a plurality of island-shaped displays configured in an array on a light transmission substrate, and an interval between two adjacent island-shaped displays is a light transmission region. The island-shaped display refers to at least one micro light-emitting diode or a micro light-emitting diode array (a micro LED array) configured on an island-shaped (or block-shaped) substrate. The second light transmission substrate consists of a plurality of optical elements configured in an array on another light transmission substrate, and an interval between two adjacent optical elements is also a light transmission region.

In the embodiment, through the island-shaped displays and the optical elements having a one-to-one correspondence and a staggered configuration with each other, the optical elements allow a plurality of discrete images projected by the island-shaped displays to be presented as a plurality of completed spliced and continuous images on the retina of the eye, and the plurality of discrete images projected by the island-shaped displays are magnified within a range of 3 to 11.3 times. That is to say, the optical elements have an image magnification rate to magnify the original plurality of discrete images, and the preset range of the image magnification rate is within 3 times to 11.3 times. When considering the configuration of other optical elements and island-shaped displays, the image magnification rate of the optical elements has other expected ranges, which are not limited to 3 to 11.3 times.

In the embodiment, in the optical element array, each optical element has a first curved surface and a second curved surface on opposite sides. A geometric center of the first curved surface and a geometric center of the second curved surface do not overlap. That is to say, there is a interval between the geometric center of the first curved surface and the geometric center of the second curved surface and the geometric center of the first curved surface and the geometric center of the second curved surface are staggered from each other.

In the embodiment, when the arrays of optical elements are microlens arrays, each microlens follows each island-shaped display (e.g., a one-to-one correspondence) and is arranged at equal distances from each other, and each microlens and each island-shaped display are not aligned with each other but staggered with each other. That is, a geometric center of the microlens does not overlap (or is not aligned) with a geometric center of the island-shaped display. For example, an island-shaped display is located at a focal point of a microlens. In addition, a distance between two adjacent island-shaped displays in the island-shaped display is larger than a distance between two adjacent optical elements in the optical element array.

In the embodiment, when the optical element of the array is a microlens array, each microlens and each island-shaped display are arranged at unequal distances from each other.

Figure 1B:
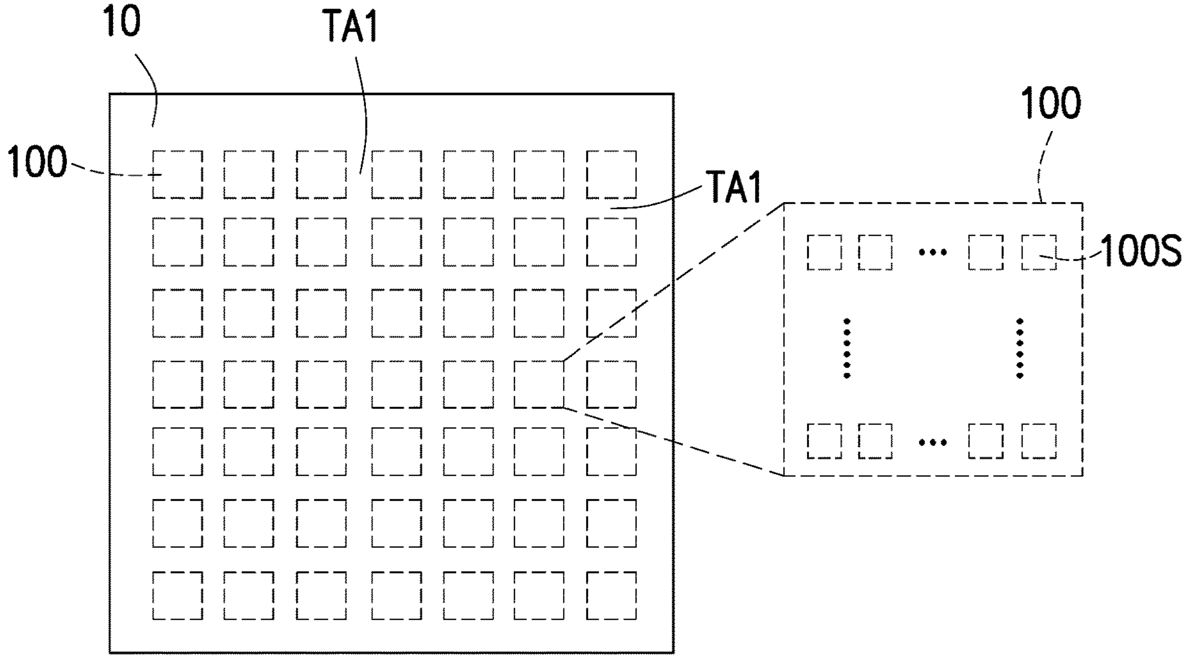
FIG. 1B to FIG. 1D are partial structural schematic views of the near-eye display device of FIG. 1A.
Figure 1B:
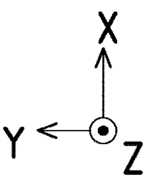
Figure 1C:
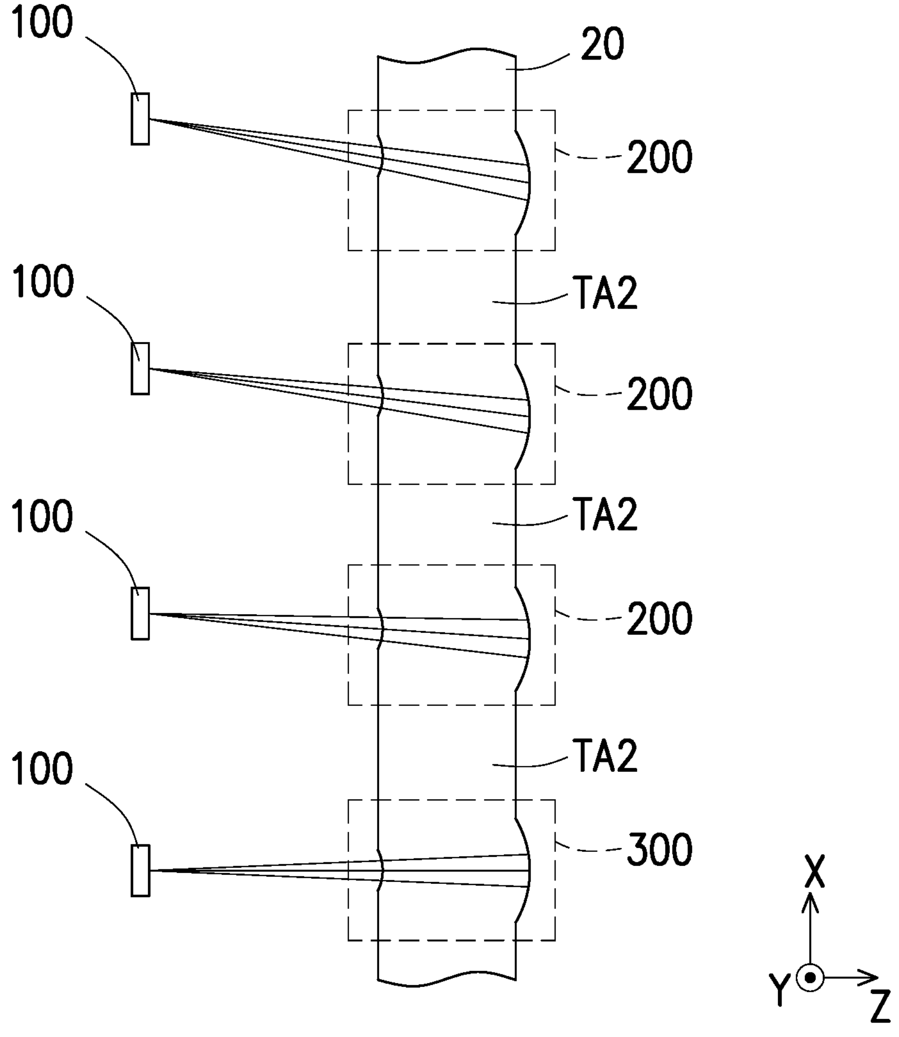
Figure 1D:
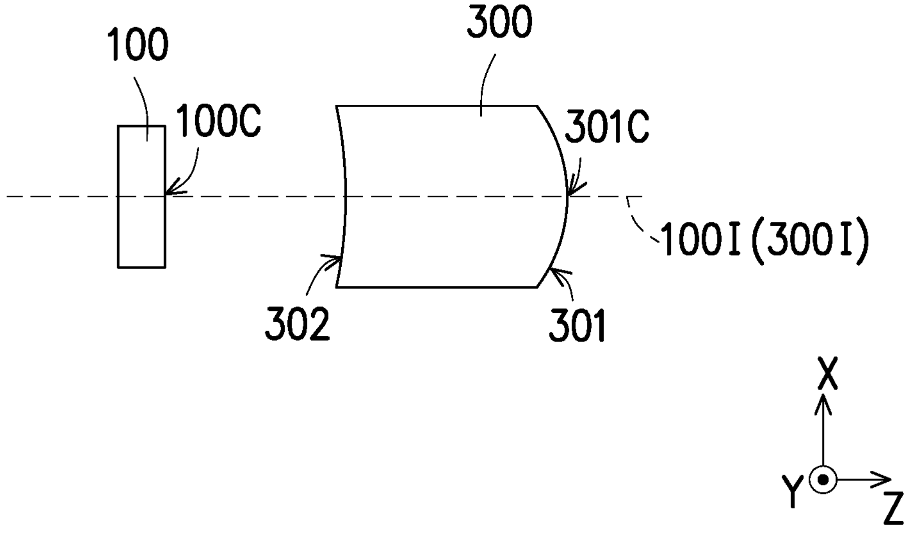

Refer to FIG. 1A to FIG. 1D. FIG. 1A is a schematic view of a near-eye display device according to an embodiment of the disclosure, and is a partial enlarged view. FIG. 1B to FIG. 1D are partial structural schematic views of the near-eye display device of FIG. 1A.

A near-eye display device 1 may be implemented as a near-eye display device worn in front of the human eye, and includes a first light transmission substrate 10, a plurality of island-shaped displays 100 (display units 100), a second light transmission substrate 20, a plurality of microlenses 200 (or surrounding optical elements 200), and a microlens 300 (or a central optical element 300). The island-shaped displays 100, the microlenses 200, and the microlens 300 correspond to one of the left eye and the right eye of the human eye. That is to say, the left eye corresponds to the plurality of island-shaped displays 100, the plurality of microlenses 200, and one microlens 300; the right eye corresponds to another plurality of island-shaped displays 100, another plurality of microlenses 200, and another one microlens 300. In the following content, only the configuration corresponding to one of the left eye and the right eye will be described, and redundant description will be avoided.

As shown in FIG. 1A, the first light transmission substrate 10 and the second light transmission substrate 20 are parallel and in different layers in a stacking direction and are spaced apart from each other. The island-shaped displays 100 are arranged in an array on the first light transmission substrate 10, and the interval between two adjacent island-shaped displays 100 is also a light transmission region TA1. The plurality of microlenses 200 and 300 are arranged in an array on the second light transmission substrate 20, and the interval between two adjacent microlenses 200 and 300 is another light transmission region TA2. In addition, the interval between the microlens 300 and the adjacent microlens 200 is also the light transmission region TA2. Each island-shaped display 100 has a one-to-one correspondence with the microlenses 200 and 300 in the same stacking direction. The microlenses 200 are centered around the microlens 300 and surround the microlens 300.

According to an embodiment, the first light transmission substrate 10 and the second light transmission substrate 20 may be made of light transmission materials, such as acrylic, glass, sapphire, or silicon compounds.

As shown in FIG. 1B, the island-shaped displays 100 (the display units 100) are configured at predetermined positions of the first light transmission substrate 10 (as shown by the dotted box). A plurality of micro-luminescent elements 100S are configured at a predetermined position (as shown by the dotted box) of each island-shaped display 100 (the display unit 100). The micro-luminescent elements 100S may be, but are not limited to, micro-luminescent diodes. That is to say, the island-shaped display 100 (the display unit 100) refers to a predetermined position (as shown by the dotted box) on the first light transmission substrate 10 and the micro-luminescent elements 100S located at the predetermined position may be collectively regarded as an island-shaped display 100.

In addition, the first light transmission substrate 10 and the second light transmission substrate 20 may also be made of opaque material. Each island-shaped display 100 corresponds to a microlens 300 and one of the microlenses 200. More specifically, a light beam 100L emitted by each island-shaped display 100 is imaged by the corresponding microlens 300 and one of the microlenses 200, but not by other microlenses. When the near-eye display device 1 is worn in front of the human eye, the microlens 300 and the corresponding island-shaped display 100 will be roughly located in the center of the line of sight, and the microlenses 200 are distributed around the microlens 300, as shown in FIG. 1A.

As shown in FIG. 1A, when the near-eye display device 1 is configured in front of the human eye (that is, when the human eye is located in the image receiving area of the near-eye display device 1), different island-shaped displays 100 will correspond to different field of views. The different island-shaped displays 100 will be imaged at different positions of the retina of an eye 40 through different microlenses 200 and 300. Accordingly, the island-shaped displays 100 of the near-eye display device 1 may project a plurality of images at the same time to form the plurality of images that are spliced into complete and continuous images on the retina of the eye 40. That is to say, the microlenses 200 and 300 may splice a plurality of discrete images projected by the island-shaped display 100 into a complete and continuous image, and those spliced into a complete and continuous image are magnified by 3 to 11.3 times compared with the original discrete images. When an opening angle ψ1 of two adjacent microlenses 200 and 300 relative to the image receiving area is approximately the same as a full field of view angle θ1 of each of the microlenses 200 and 300, a better splicing effect may be obtained. In some embodiments, the above-mentioned full field of view angle θ1 falls within a range of 2 degrees to 10 degrees.

In the embodiment, the second light transmission substrate 20, the microlenses 200, and the microlens 300 are integrally formed or configured by a substrate splicing method. Specifically, the second light transmission substrate 20, the microlenses 200, and the microlens 300 include the same material. The microlenses 200 and the microlens 300 are portions of the second light transmission substrate 20 that have refractive power. The portion of the second light transmission substrate 20 that does not have refractive power is the light transmission region TA2.

Referring to FIG. 1A and FIG. 1C at the same time, FIG. 1C is a schematic view of a configuration of some island-shaped displays 100 and the corresponding microlens 300 and the microlenses 200 in the near-eye display device 1 of FIG. 1A.

As shown in FIG. 1C, the first light transmission substrate 10 and the second light transmission substrate 20 are configured in parallel, and normal lines of the two first light transmission substrates 10 and the second light transmission substrate 20 are parallel to a Z direction. As shown in FIG. 1A and FIG. 1C, each microlens 200 includes a first surface 201 away from the corresponding island-shaped display 100 and a second surface 202 close to the corresponding island-shaped display 100. Each first surface 201 is a convex surface relative to the second light transmission substrate 20, each second surface 202 is a concave surface relative to the second light transmission substrate 20, and an area of the first surface 201 is greater than or equal to an area of the second surface 202 (that is, an optical effective diameter of the first surface 201 is greater than an optical effective diameter of the second surface 202). In some embodiments, the optical effective diameter (the diameter) of the first surface 201 falls within a range of 0.45 mm to 1.4 mm, and the optical effective diameter (the diameter) of the second surface 202 falls within a range of 0.35 mm to 1.3 mm, but not limited thereto.

The first surface 201 of each microlens 200 includes a geometric center 201C, and the second surface 202 of each microlens 200 includes a geometric center 202C. A radius of curvature at the geometric center 201C of the first surface 201 is smaller than a radius of curvature at the geometric center 202C of the second surface 202. The first surface 201 is circularly symmetrical relative to the geometric center 201C thereof, and the second surface 202 is off-axis asymmetric relative to the geometric center 202C thereof.

Each microlens 200 has a mirror axis 200I passing through the geometric center 201C and parallel to the Z direction. The mirror axis 200I that passes through the geometric center 201C and is parallel to the Z direction does not pass through the geometric center 202C of the second surface 202. In other words, the connecting line of the geometric center 201C of the first surface 201 and the geometric center 202C of the second surface 202 is not parallel to the Z direction (that is, not parallel to the normal line of the second light transmission substrate 20).

Each island-shaped display 100 has a central axis 100I passing through a geometric center 100C of a display surface thereof and parallel to the Z direction. A vertical projection of the display surface geometric center 100C of each island-shaped display 100 on the second light transmission substrate 20 does not overlap the corresponding geometric center 201C of the first surface 201. In other words, the central axis 100I of the island-shaped display 100 does not overlap with the mirror axis 200I of the corresponding microlens 200, and a distance $D_{12}$ between the two in an X direction is greater than 0. To be more specific, the island-shaped display 100 and the corresponding microlens 200 are misaligned in the X direction.

In contrast, referring to FIG. 1A, FIG. 1C, and FIG. 1D at the same time, FIG. 1D exemplarily illustrates a configuration of the microlens 300 and the corresponding island-shaped display 100. The microlens 300 includes a first surface 301 away from the corresponding island-shaped display 100 and a second surface 302 close to the corresponding island-shaped display 100. Each first surface 301 is a convex surface relative to the second light transmission substrate 20, and each second surface 302 is a concave surface relative to the second light transmission substrate 20. The first surface 301 of the microlens 300 includes a geometric center 301C. The microlens 300 has a mirror axis 300I that passes through the geometric center 301C and is parallel to the Z direction. The island-shaped display 100 has the central axis 100I passing through the geometric center 100C of the display surface thereof and parallel to the Z direction. The vertical projection of the display surface geometric center 100C of each island-shaped display 100 on the second light transmission substrate 20 overlaps the corresponding geometric center 301C of the first surface 301, as shown in FIG. 1D. In other words, the mirror axis 300I of the microlens 300 overlaps with the corresponding central axis 100I of the island-shaped display 100. More specifically, the microlens 300 and the corresponding island-shaped display 100 are not misaligned in the X direction.

When the near-eye display device 1 is configured in front of the human eye, the microlens 300 and the corresponding island-shaped display 100 will be approximately located in the center of the line of sight, as shown in FIG. 1A. However, the disclosure is not limited thereto. In some embodiments, the near-eye display device 1 may only include the plurality of microlenses 200 and the corresponding island-shaped displays 100. The microlens 200 and the island-shaped display 100 configured in a one-to-one pair are misaligned with each other, but the near-eye display device 1 may not include the microlens 300.

Figure 2A:
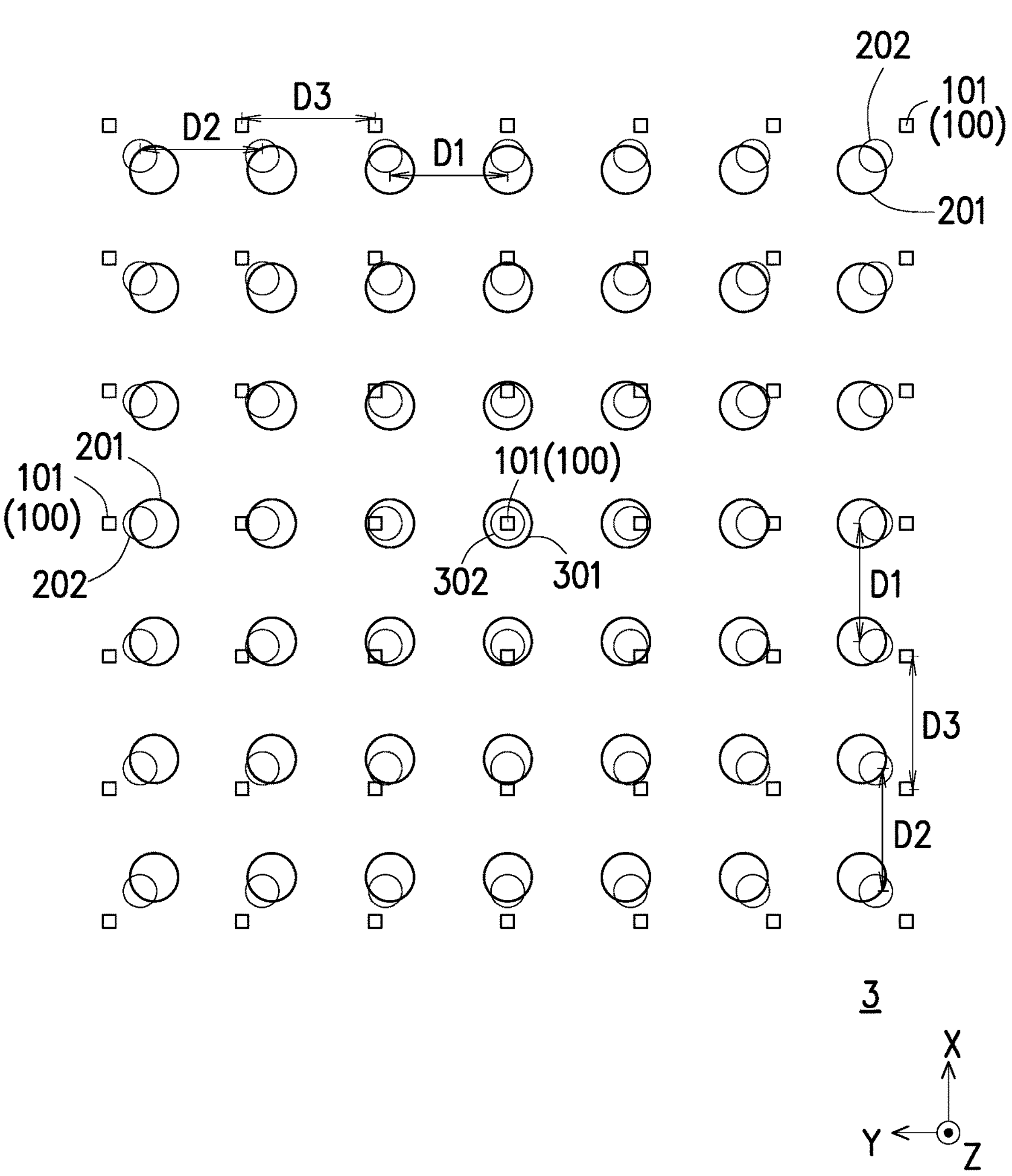
FIG. 2A is a schematic view of a configuration of each optical surface of a near-eye display device according to an embodiment of the disclosure.
Figure 2B:
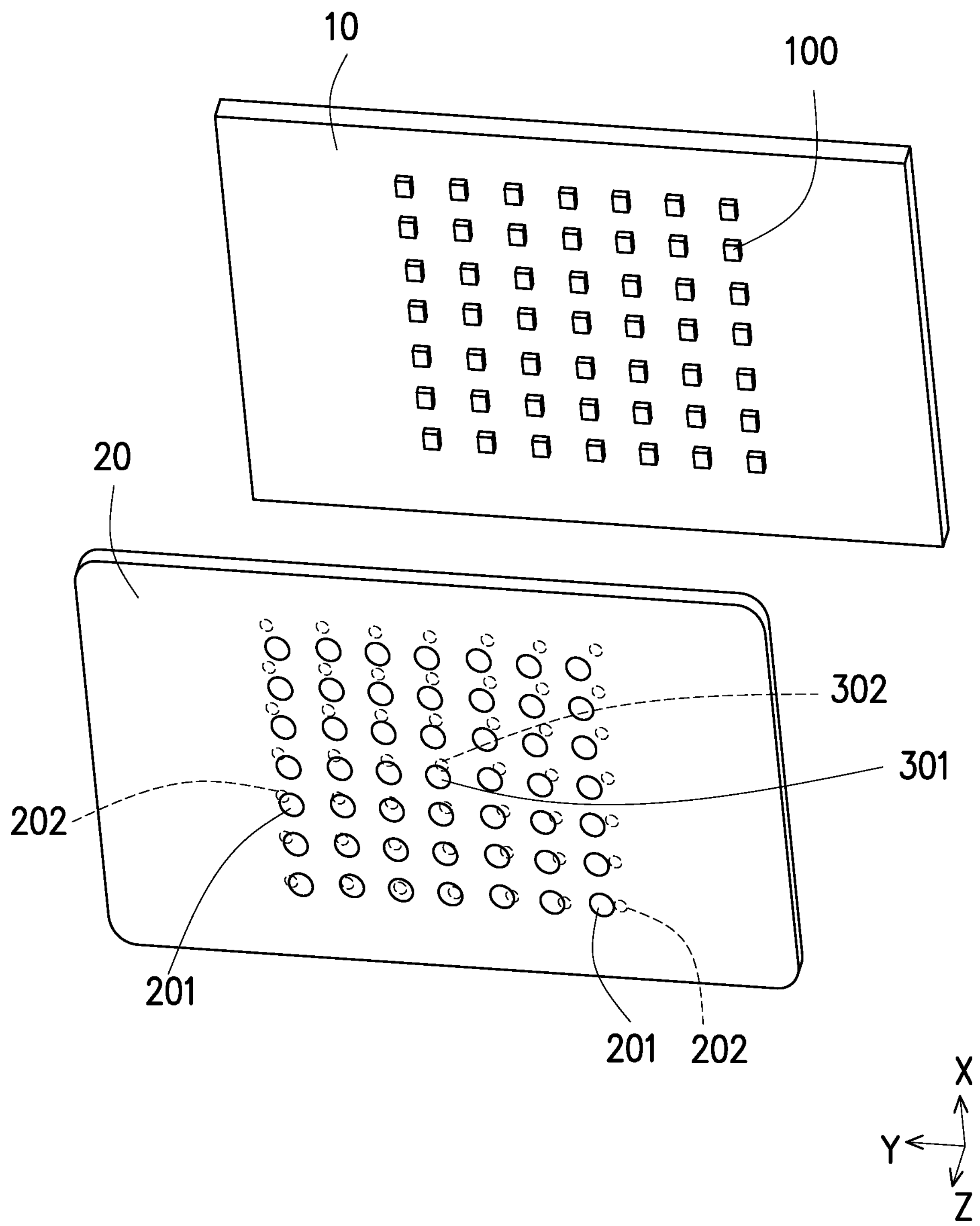
FIG. 2B is an exploded view of a first light transmission substrate and a second light transmission substrate in a near-eye display device according to an embodiment of the disclosure.
Figure 2C:
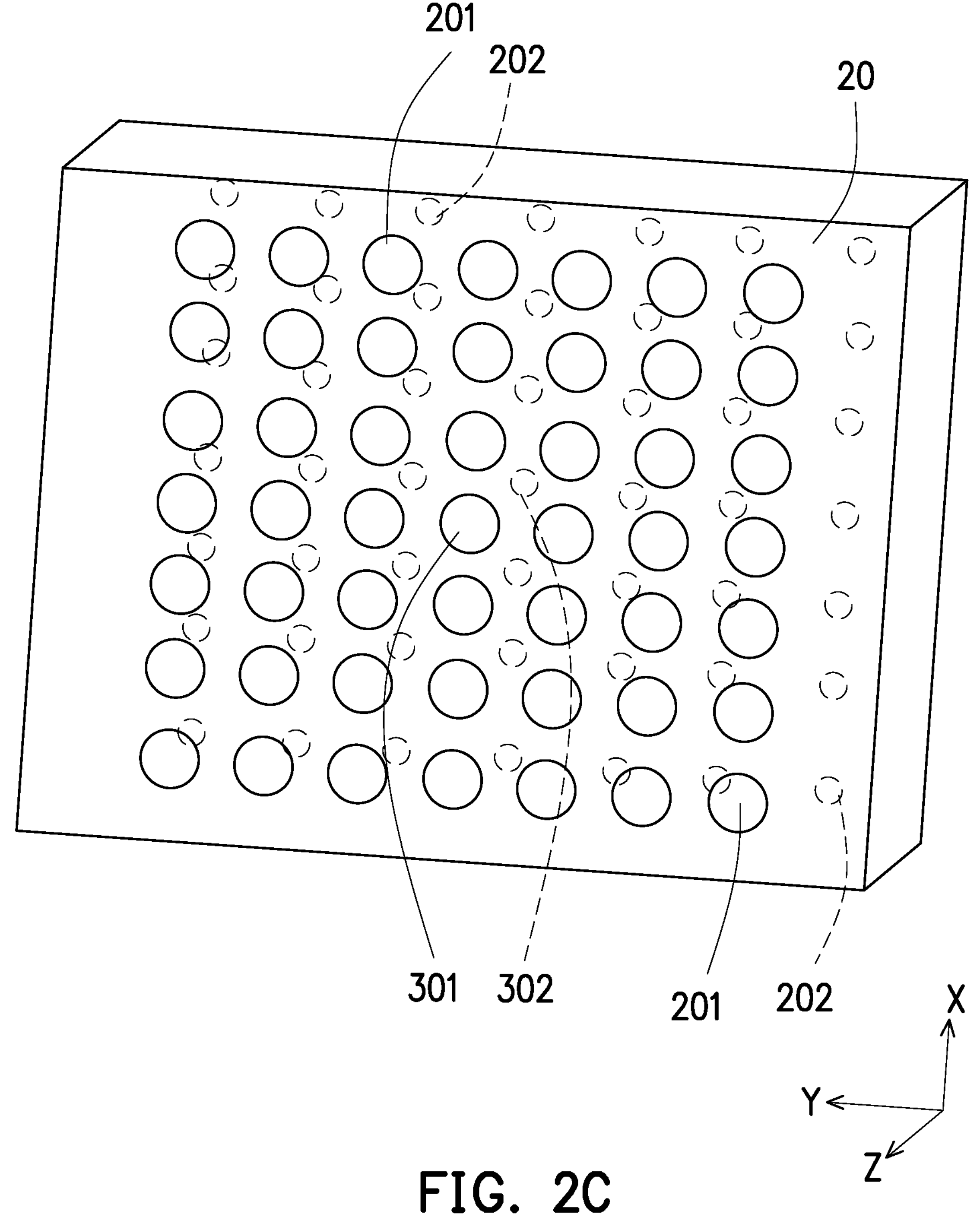
FIG. 2C is a schematic three-dimensional view of a second light transmission substrate.

Referring to FIG. 2A, FIG. 2B, and FIG. 2C, FIG. 2A is a schematic view of a configuration of each optical surface of a near-eye display device according to an embodiment of the disclosure. FIG. 2B is an exploded view of a first light transmission substrate and a second light transmission substrate in a near-eye display device according to an embodiment of the disclosure. FIG. 2C is a schematic three-dimensional view of a second light transmission substrate. A near-eye display device 3 includes the plurality of island-shaped displays 100, the plurality of microlenses 200, and the microlens 300. A configuration relationship of display surfaces 101 of the island-shaped displays 100, the first surfaces 201 of the microlenses 200, the second surfaces 202 of the microlenses 200, the first surface 301 of the microlens 300, and the second surface 302 of the microlens 300 is shown in FIG. 2A.

The island-shaped displays 100 are arranged in an M×N matrix. Correspondingly, the microlenses 200 and 300 are also arranged in an M×N matrix, where M is the number of columns along the X direction, N is the number of rows along a Y direction, and both M and N are odd numbers greater than 1. The microlenses 200 are centered around the microlens 300 and surround the microlens 300. As shown in FIG. 2A, the island-shaped displays 100 and the microlenses 200 and 300 are arranged in a 7×7 matrix, but M and N are not limited to 7, and M is not limited to be the same as N. In some embodiments, the number of rows M along the X direction may be greater than the number of columns N along the Y direction.

In some embodiments, the number of rows M along the X direction may be smaller than the number of columns N along the Y direction.

As shown in FIG. 2A to FIG. 2C, a plurality of display surfaces 101 are arranged in an array; correspondingly, the first surface 301 and a plurality of first surfaces 201 are arranged in an array, and the second surface 302 and a plurality of second surfaces 202 are arranged in an array. There is a first interval D1 between the first surface 301 and the adjacent first faces 201. The first interval D1 refers to the distance between the geometric centers of the two adjacent first faces 201 and 301. There is a second interval D2 between the second surface 302 and the adjacent second surfaces 202. The second interval D2 refers to the distance between the geometric centers of the two adjacent second surfaces 202 and 302. There is a third interval D3 between two adjacent display surfaces 101. The third interval D3 refers to the distance between the geometric centers of the two adjacent display surfaces 101. The second interval D2 is greater than the first interval D1 and smaller than the third interval D3. In some embodiments, the first interval D1 falls within a range of 1.42 mm to 1.82 mm, the second interval D2 falls within a range of 1.47 mm to 1.87 mm, and the third interval D3 falls within a range of 1.50 mm to 1.90 mm within, but not limited thereto.

By configuring the area of the first surface 201 to be greater than or equal to the area of the second surface 202, the second surface 202 to be off-axis asymmetric relative to the geometric center thereof, and the second interval D2 to be greater than the first interval D1 and smaller than the third interval D3, so that the connecting line of the geometric center 201C of the first surface 201 and the geometric center 202C of the second surface 202 is not parallel to the normal line of the second light transmission substrate 20, the near-eye display device 1 may have the maximized light transmission region TA1 and light transmission region TA2. Compared with previous technologies, the near-eye display device 1 increases the effective light transmission area by 4 to 5 times on the premise of providing a complete and continuous image. When the near-eye display device 1 is applied to Augmented Reality (AR) technology, it may seamlessly blend the real environment with the virtual image.

Figure 2D:
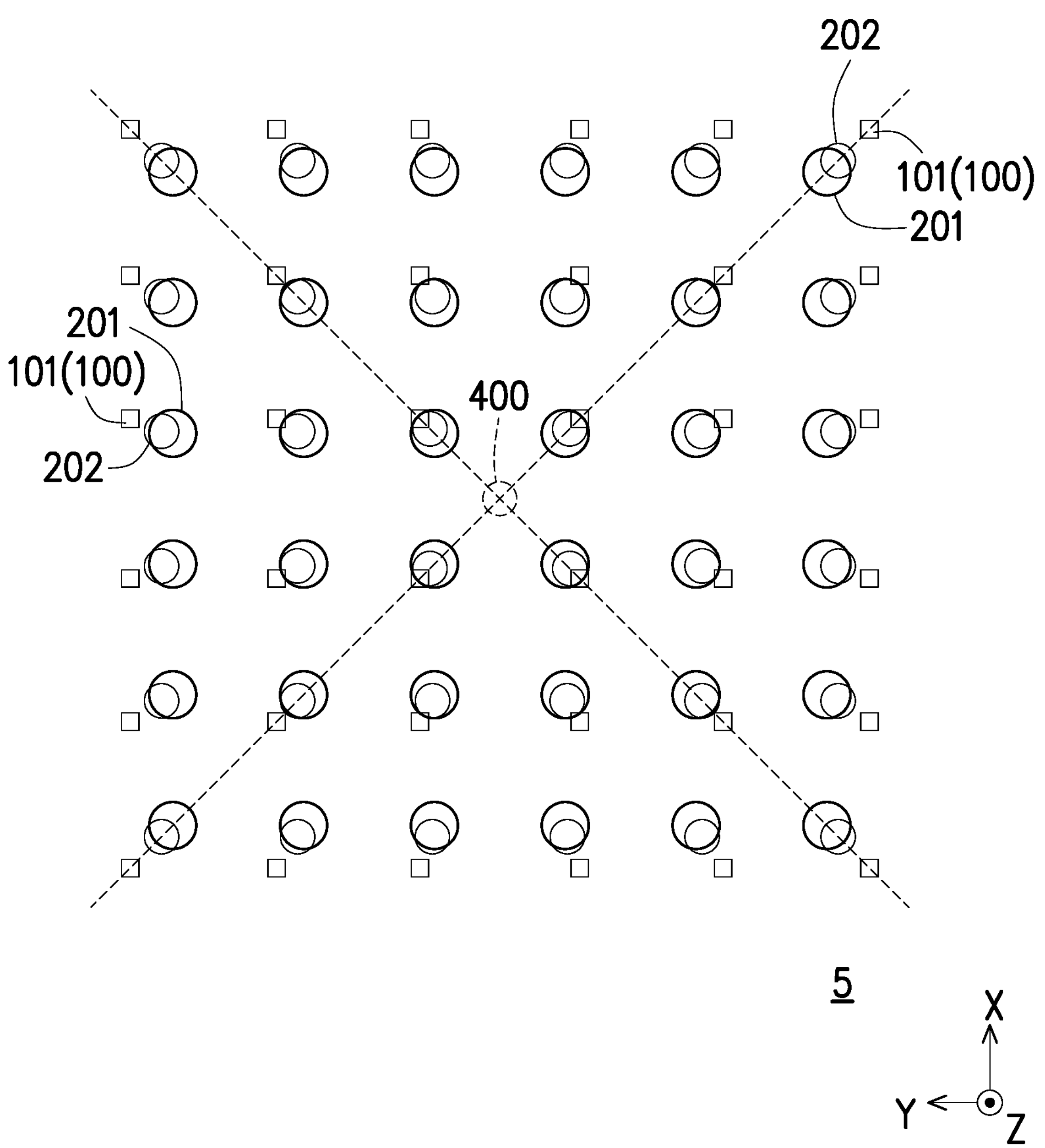
FIG. 2D is a schematic view of a configuration of each optical surface of a near-eye display device according to an embodiment of the disclosure.

Referring to FIG. 2D, a schematic view of a configuration of each optical surface of a near-eye display device according to another embodiment of the disclosure is shown. A near-eye display device 5 includes the plurality of island-shaped displays 100 and the plurality of microlenses 200. The configuration relationship of the display surfaces 101 of the island-shaped displays 100, the first surfaces 201 of the microlenses 200, and the second surfaces 202 of the microlenses 200 is as shown in FIG. 2D.

The island-shaped displays 100 are arranged in an M×N matrix, and correspondingly, the microlenses 200 are also arranged in an M×N matrix. M is the number of columns along the X direction, N is the number of rows along the Y direction, both M and N are greater than 1, and at least one of M and N is an even number. As shown in FIG. 2D, each island-shaped display 100 has a one-to-one correspondence with the microlens 200 in the stacking direction, and the island-shaped displays 100 and the microlenses 200 are arranged in a 6×6 matrix. However, M and N are not limited to 6, and M is not limited to be the same as N. In some embodiments, the number of rows M along the X direction may be greater than the number of columns N along the Y direction. Taking the intersection point of two diagonals of the matrix as a virtual center 400, the island-shaped displays 100 and the microlenses 200 surround the virtual center 400.

In some embodiments, the number of rows M along the X direction may be smaller than the number of columns N along the Y direction.

Figure 3:
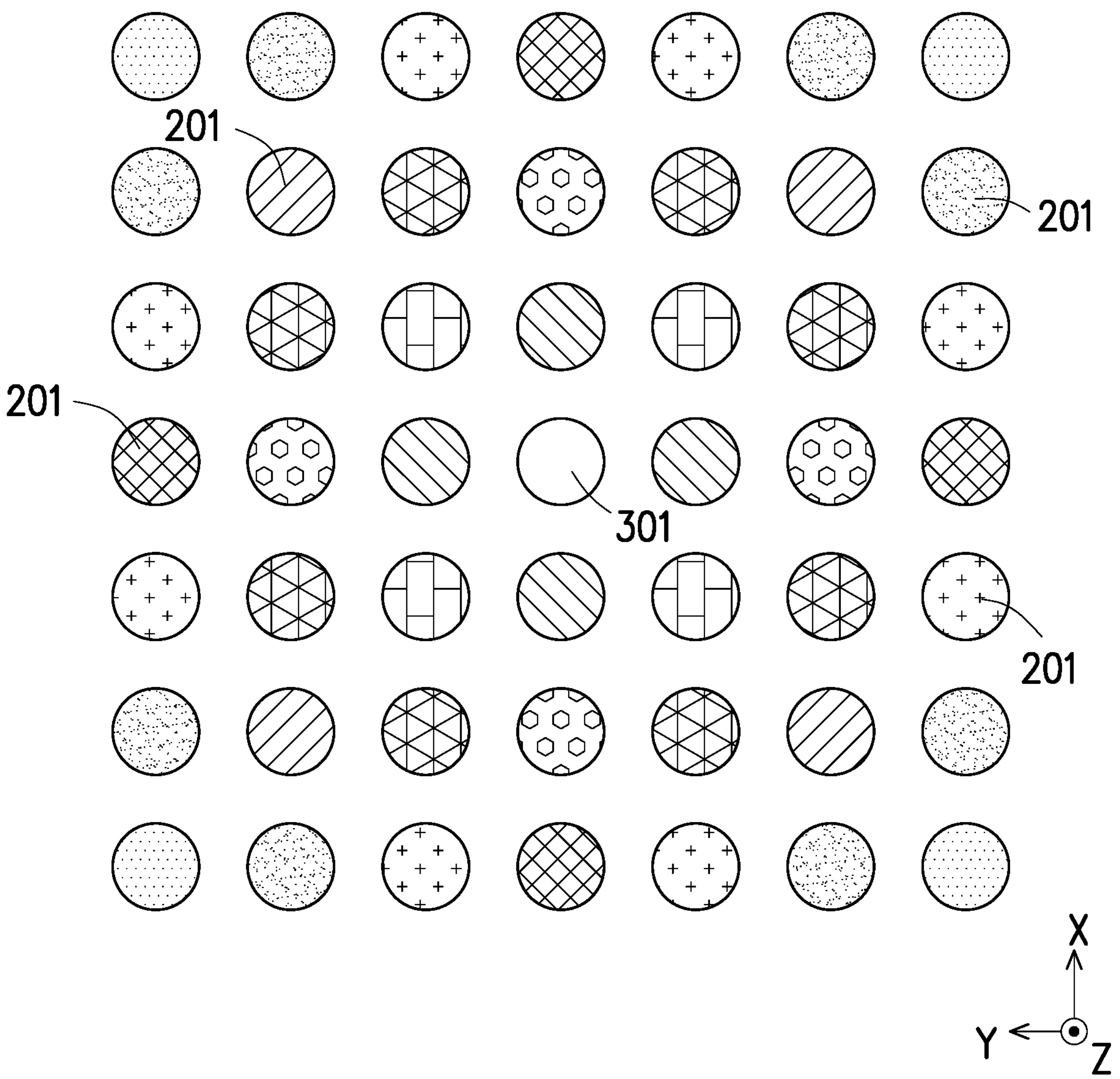
FIG. 3 is a schematic view of a configuration of a curvature radius of an optical surface in a near-eye display device according to an embodiment of the disclosure.

Referring to FIG. 3, it schematically illustrates a configuration relationship of the radius of curvature at the geometric center of the first surface 301 of the microlens 300 of the near-eye display device of FIG. 1A and the radius of curvatures at the geometric centers of the first surfaces 201 of the microlenses 200 configured around the microlens 300. The first surfaces 201 whose radius of curvatures are the same at the geometric centers thereof are drawn in the same pattern.

As shown in FIG. 3, the radius of curvature at the geometric center of the first surface 301 of the microlens 300 is different from the radius of curvatures at the geometric centers of the first surfaces 201 of all microlenses 200. For different microlenses 200 having the same distance from the microlens 300, the radius of curvatures at the geometric centers of the first surfaces 201 of the different microlenses 200 are the same. For different microlenses 200 having different distances from the microlens 300, the radius of curvatures at the geometric centers of the first surfaces 201 of the different microlenses 200 are different.

In addition, the near-eye display device 1 includes different island-shaped displays 100, and the different island-shaped displays 100 correspond to different field of views. In order to allow all the light of the island-shaped displays 100 to overlap at the pupil of the eye before entering the eye and imaging on the retina, each microlens 200 is configured to be misaligned with the corresponding island-shaped display 100. The radius of curvatures at the geometric centers of the first surfaces 201 of different microlenses 200 may be different, and the second surface 202 of each microlens 200 is off-axis asymmetric relative to the geometric center thereof.

Figure 4:
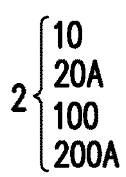
FIG. 4 is a schematic view of a near-eye display device according to an embodiment of the disclosure.
Figure 4:
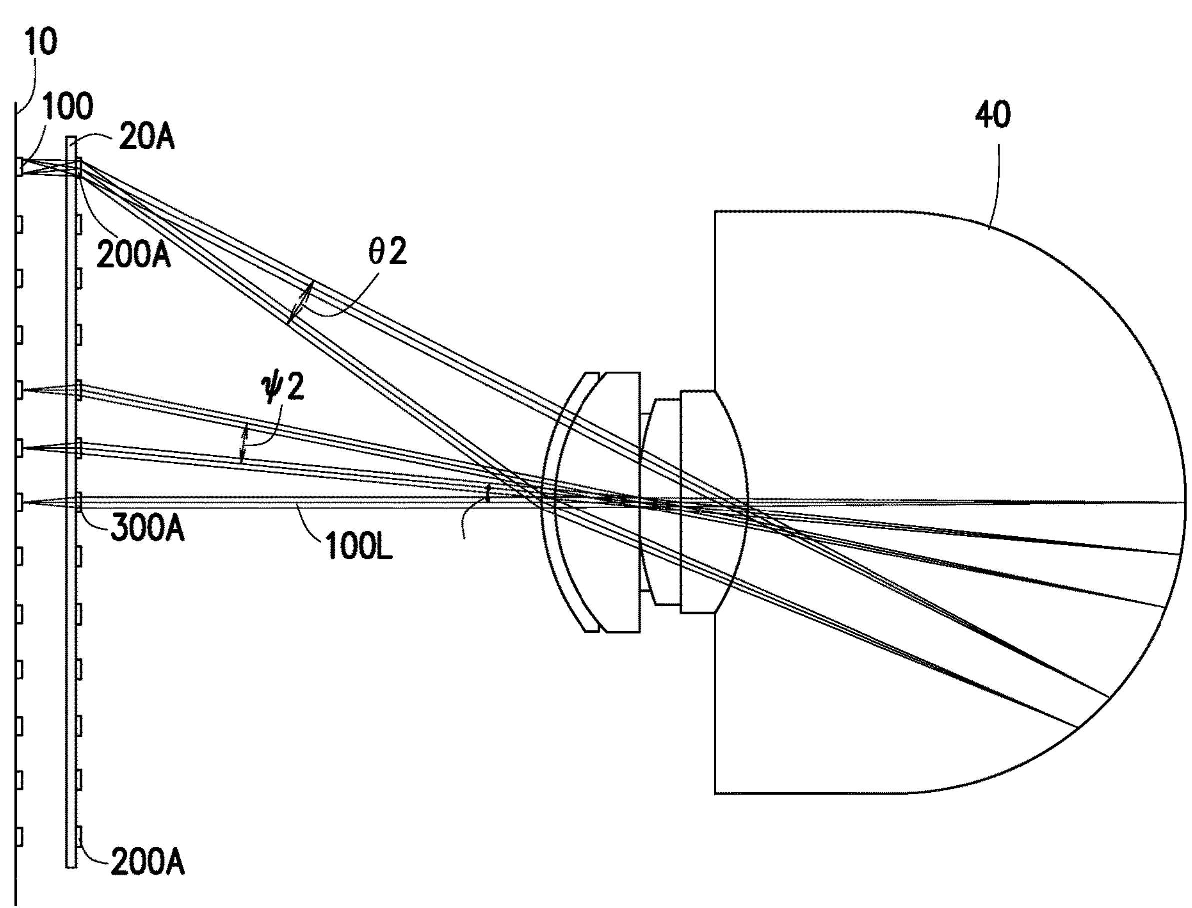
Figure 4:
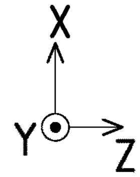

Please refer to FIG. 1B, FIG. 4, FIG. 5A, and FIG. 5B at the same time. As shown in FIG. 4, according to an embodiment of the disclosure, a near-eye display device 2 includes the first light transmission substrate 10, the plurality of island-shaped displays 100, a second light transmission substrate 20A, a plurality of metalenses 200A, and a metalens 300A. The near-eye display device 2 may be implemented as a near-eye display device worn in front of the human eye.

The metalens 300A and the metalenses 200A are configured in an array on the second light transmission substrate 20A. An area on the second light transmission substrate 20A where the metalenses 200A and 300A are not configured is a light transmission region. Each island-shaped display 100 corresponds to the metalens 300A and one of the metalenses 200A. The connecting line of the geometric center of the display surface of each island-shaped display 100 and the geometric center of the corresponding metalens 200A or 300A is parallel to the Z direction. That is to say, the vertical projection of the geometric center of the display surface of each island-shaped display 100 on the second light transmission substrate 20A overlaps the geometric center of the corresponding metalens 200A and 300A. The light beam 100L emitted by any island-shaped display 100 is only imaged by the corresponding metalens 200A or 300A, and will not be imaged by other metalenses 300A or 200A. Each island-shaped display 100 is configured on the focal plane of the corresponding metalens 200A and 300A. The divergent light emitted by the island-shaped display 100 is formed into collimated light after penetrating the corresponding metalenses 200A and 300A.

When the near-eye display device 2 is worn in front of the human eye, the metalens 300A and the corresponding island-shaped display 100 will be approximately located in the center of the line of sight, and the metalenses 200A are distributed around the metalens 300A. However, the disclosure is not limited thereto. In some embodiments, the near-eye display device 2 does not include the metalens 300A.

As shown in FIG. 1B, the island-shaped displays 100 are configured in an array on the first light transmission substrate 10, and there is the light transmission region TA1 between two adjacent island-shaped displays 100.

As shown in FIG. 4, when the near-eye display device 2 is configured in front of the human eye, different island-shaped displays 100 will correspond to different field of views. The different island-shaped displays 100 are respectively imaged at different positions of the retina of the eye 40 through different metalenses 200A and 300A. Accordingly, the island-shaped displays 100 of the near-eye display device 2 may at the same time form a plurality of images on the retina of the eye 40, with the image magnification falling within a range of 3 to 11.3 times, and the images are spliced into a complete and continuous image. When an opening angle ψ2 of two adjacent metalenses 200A and 300A relative to the image receiving area is approximately the same as a full field of view angle θ2 of each of the metalenses 200A and 300A, a better splicing effect may be obtained. In some embodiments, the above-mentioned full field of view angle θ2 falls within a range of 2 degrees to 10 degrees.

Figure 5A:
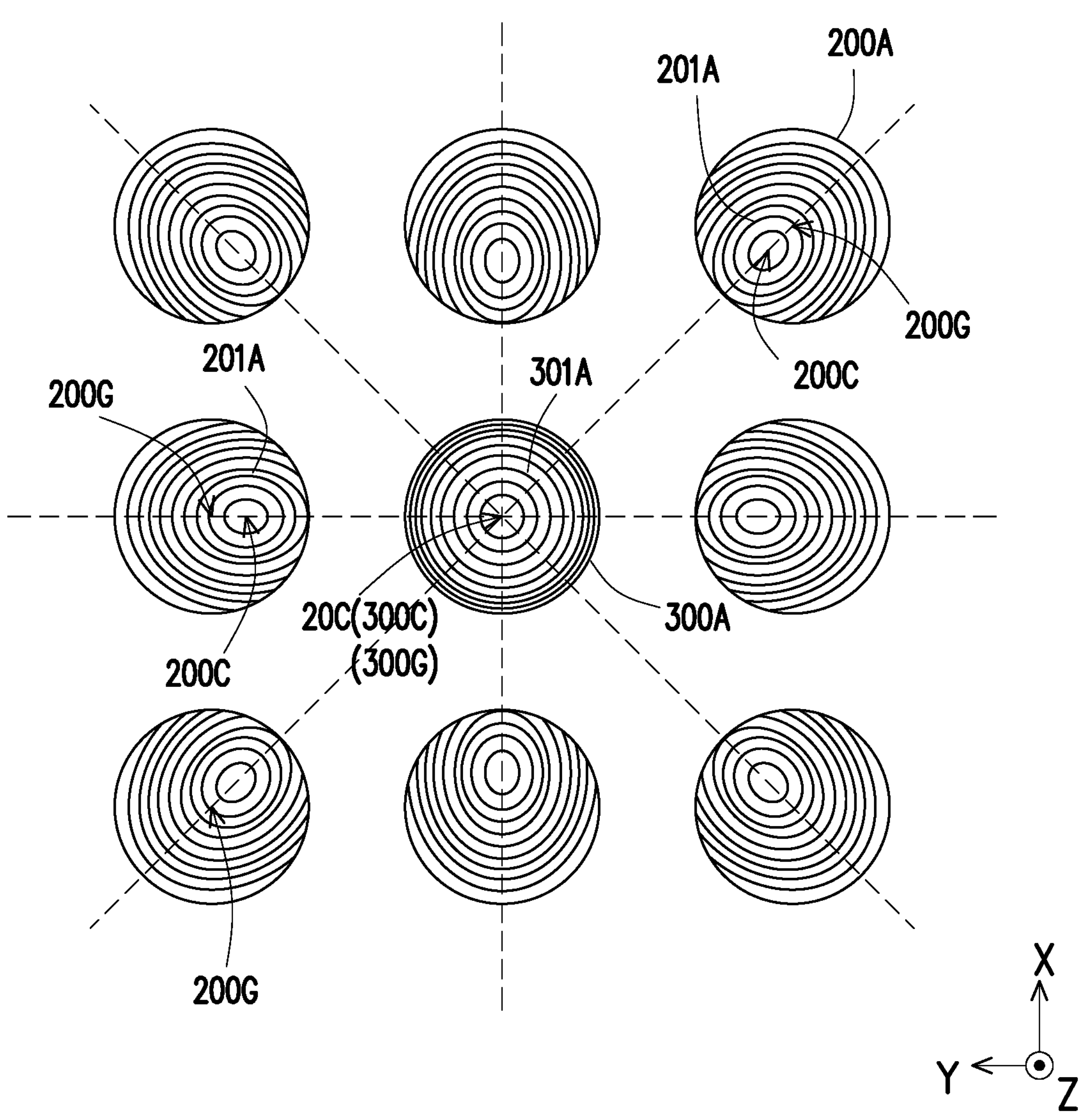
FIG. 5A is a schematic view of a metalens array in a near-eye display device according to an embodiment of the disclosure.
Figure 5B:
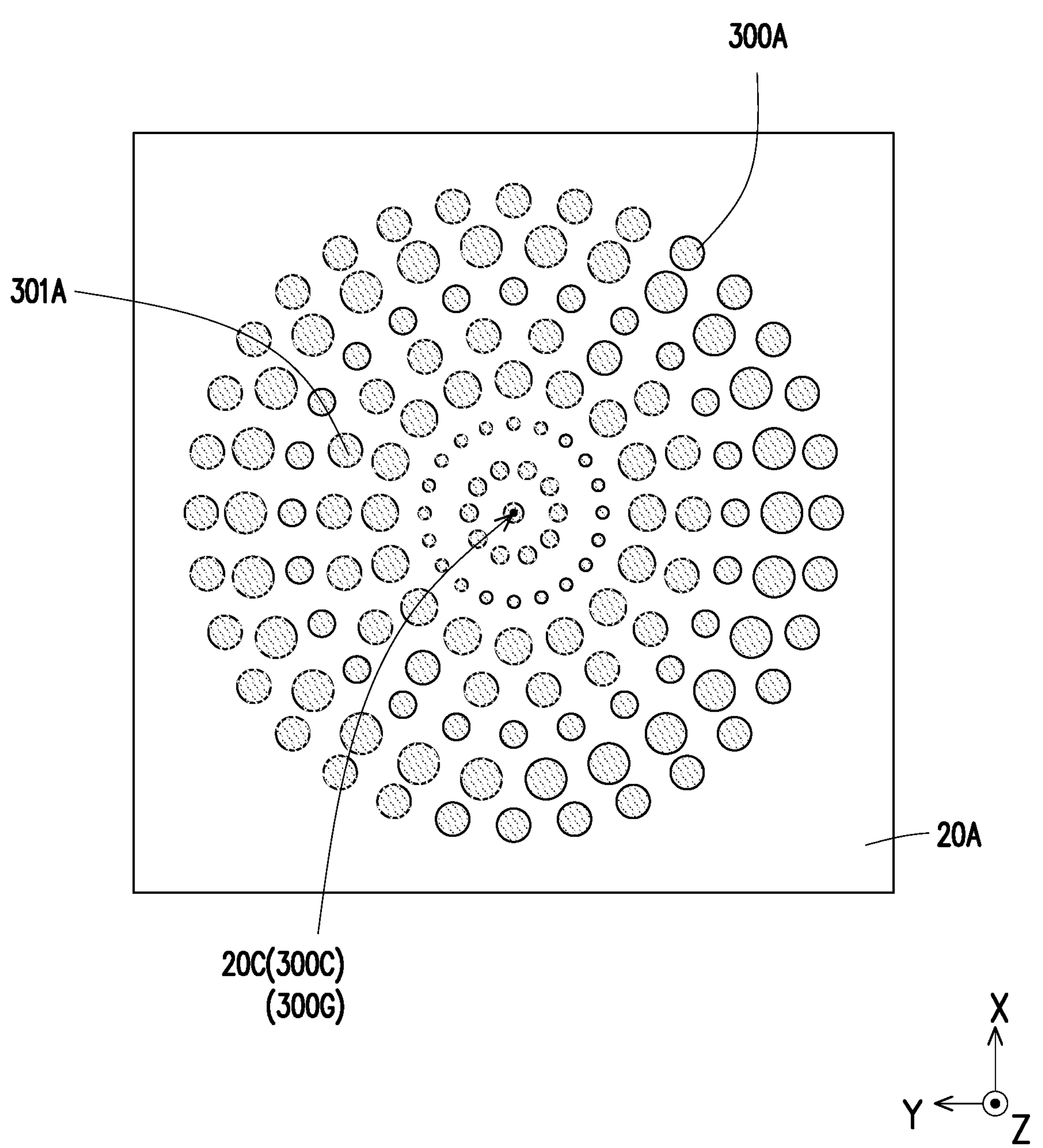
FIG. 5B is a schematic view of a metalens in a near-eye display device according to an embodiment of the disclosure.

Referring to FIG. 5A and FIG. 5B, in some embodiments, the near-eye display device 2 has the metalens 300A and the plurality of metalenses 200A. The metalenses 200A are arranged in an array with a geometric center 20C of the second light transmission substrate 20A as the center.

The metalens 300A includes a plurality of nano-columns 301A and an axis 300C. The nano-columns 301A with the same diameter or diagonal are arranged in a circle relative to the axis 300C. The axis 300C is located at a geometric center 300G of the metalens 300A, and the axis 300C overlap the geometric center 20C of the second light transmission substrate 20A.

Each metalens 200A includes a plurality of nano-columns 201A and an axis 200C. The nano-columns 201A with the same diameter or diagonal are arranged in concentric circles or concentric ellipses relative to the axis 200C, and the axis 200C thereof deviates from a geometric center 200G of the metalens 200A. In some embodiments, the axis 200C may be located within metalens 200A or outside the metalens 200A.

In some embodiments, the nano-columns 201A and the nano-columns 301A may be cylinders, rectangular columns, or polygonal columns. The diameter of the cylinder, the diagonal of the rectangular column, or the maximum diameter of the polygonal column may fall within a range of 20 nm to 500 nm. The diameter or diagonal of the nano-column 201A configured at the axis 200C is greater than or equal to 0.4 times the diameter or diagonal of the nano-column 201A with the maximum diameter or diagonal in the metalens 200A. The diameter or diagonal of the nano-column 301A configured at the axis 300C is greater than or equal to 0.4 times the diameter or diagonal of the nano-column 301A with the maximum diameter or diagonal in the metalens 300A.

In some embodiments, the distance between two adjacent nano-columns 201A or two adjacent nano-columns 301A may fall within a range of 20 nm to 550 nm. The heights of the nano-column 201A and the nano-column 301A may fall within a range of 500 nm to 1500 nm.

Referring to FIG. 5B, the metalens 300A and the set of the metalenses 200A are regarded as a virtual lens. The metalens 300A is equivalent to the paraxial area of the virtual lens, collimating the light beam 100L emitted by the corresponding island-shaped display 100.

The metalenses 200A respectively correspond to different areas other than the paraxial area of the virtual lens, and not only collimate the light beam 100L emitted by the corresponding island-shaped display 100, but are also used to deflect the light beam 100L. Therefore, with the geometric center 20C of the second light transmission substrate 20A as the symmetry center, the nano-columns 201A in the two metalenses 200A configured on the opposite sides will be arranged in the same way, and the distance between their respective axes 200C and the geometric center 20C is the same as shown in FIG. 5A. Moreover, the connecting line between the axes 200C of the two metalenses 200A will pass through the geometric center 20C of the second light transmission substrate 20A. The axes 200C of the two metalenses 200A will deviate from the geometric center 200G of the metalens 200A along the extending direction of the connecting line.

As shown in FIG. 5A, the metalenses 200A and 300A are arranged in an M×N matrix. Although not shown in FIG. 5A, the island-shaped displays corresponding to the metalenses 200A and 300A are also arranged in an M×N matrix. Where M is the number of columns along the X direction, N is the number of rows along the Y direction, and both M and N are odd numbers greater than 1. The metalenses 200A are centered around the metalens 300A and surround the metalens 300A. As shown in FIG. 5A, the metalenses 200A and 300A are arranged in a 3×3 matrix, but M and N are not limited to 3, and M is not limited to be the same as N. In some embodiments, the number of rows M along the X direction may be greater than the number N of columns along the Y direction.

In some embodiments, the number of rows M along the X direction may be smaller than the number N of columns along the Y direction.

Figure 6:
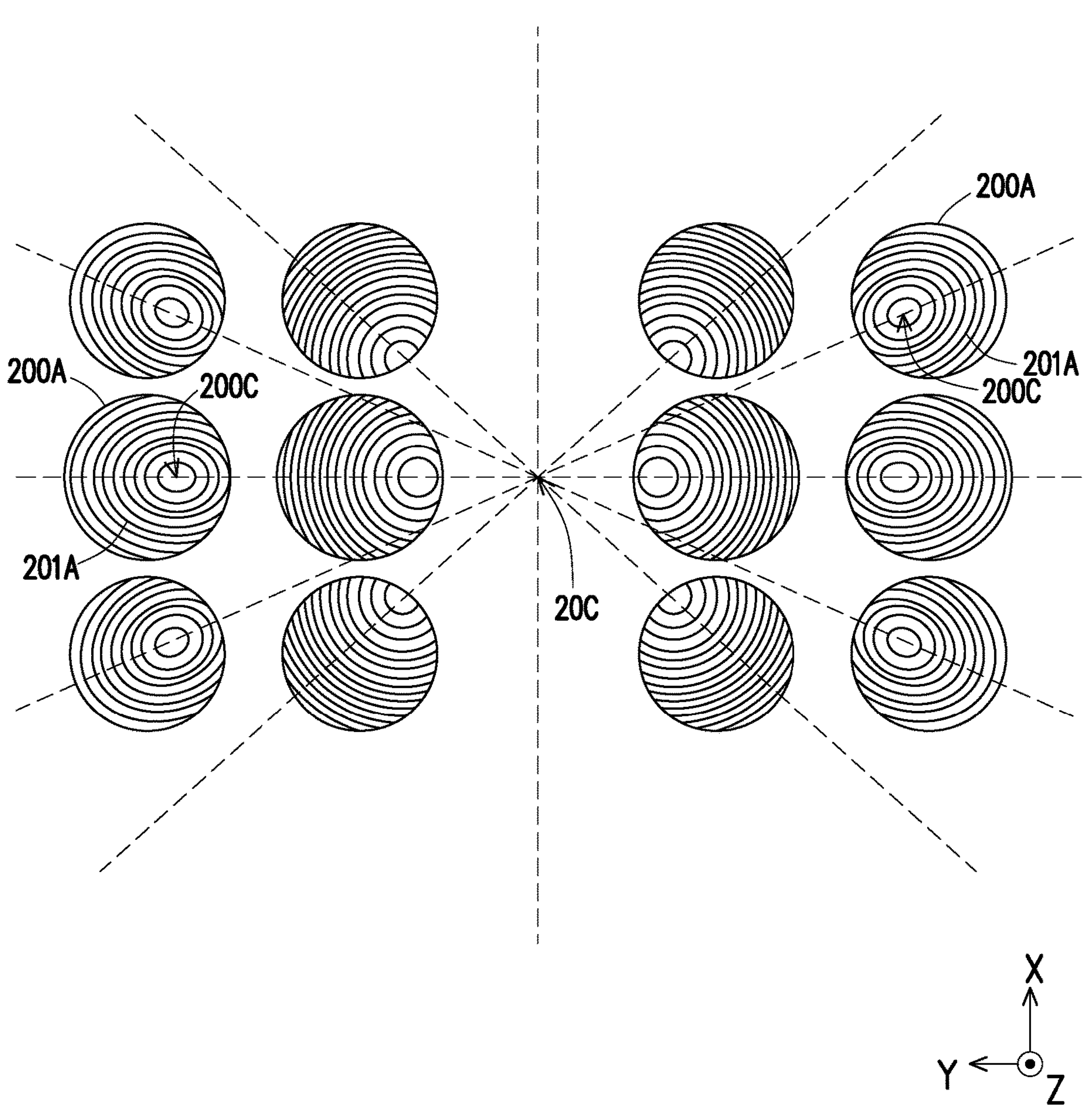
FIG. 6 is a schematic view of a metalens array in a near-eye display device according to an embodiment of the disclosure.

Referring to FIG. 6, in another embodiment, the near-eye display device 2 has the plurality of metalenses 200A but does not have the metalens 300A. Each metalens 200A includes the plurality of nano-columns 201A and the axis 200C. The nano-columns 201A with the same diameter or diagonal are arranged in concentric circles or concentric ellipses relative to the axis 200C. The metalenses 200A are arranged in an array with the geometric center 20C of the second light transmission substrate 20A as the center. Furthermore, the metalenses 200A are arranged in an M×N matrix. Although not shown in FIG. 6, the island-shaped displays corresponding to the metalenses 200A are also arranged in an M×N matrix. M is the number of columns along the X direction, N is the number of rows along the Y direction, both M and N are greater than 1, and at least one of M and N is an even number. As shown in FIG. 6, the metalenses 200A are arranged in a 3×4 matrix. The metalenses 200A are arranged in an array with the geometric center 20C of the second light transmission substrate 20A as the center.

With the geometric center 20C of the second light transmission substrate 20A as the symmetry center, the nano-columns 201A in the two metalenses 200A configured on the opposite sides will be arranged in the same way, and the distance between their respective axes 200C and the geometric center 20C is the same. The connecting line between the axes 200C of the two metalenses 200A passes through the geometric center 20C of the second light transmission substrate 20A.

Referring again to FIG. 5A, the axes 200C of the metalenses 200A are all within the metalens 200A. In contrast, referring to FIG. 6, the axis 200C of part of the metalens 200A is not within the metalens 200A, but deviates greatly from the geometric center of the metalens 200A, and is located outside the metalens 200A in the form of a virtual axis.

That is to say, by configuring the above-mentioned metalenses 200A and metalens 300A, the island-shaped displays 100 may at the same time form a complete and continuous image on the retina of the eye 40, and the areas of the metalenses 200A and the metalens 300A on the X-Y plane may be minimized to maximize the light transmission region on the second light transmission substrate 20A. That is, the effective light transmission area of the near-eye display device 2 may be maximized.

To sum up, since each optical element follows each island-shaped display and is spaced apart from each other, the line of sight of the user may penetrate the virtual image and see a clear real scene of the environment when using the embodiments of the disclosure. At the same time, the virtual image seen by the user is a continuous spliced image.

What is claimed is:

1. A near-eye display device, comprising:

a first light transmission substrate;

a plurality of arrays of display units, configured on the first light transmission substrate, wherein an interval between two adjacent display units is a light transmission region;

a second light transmission substrate, configured in a different layer from the first light transmission substrate in a stacking direction; and a plurality of arrays of optical elements, configured on the second light transmission substrate, wherein an interval between two adjacent optical elements is a light transmission region, and each of the display units has a one-to-one correspondence with the optical element in the stacking direction, wherein the first light transmission substrate and the second light transmission substrate are configured in parallel, each of the optical elements is a microlens and comprises a first surface away from the corresponding display unit and a second surface close to the corresponding display unit, each first surface comprises a geometric center, and a vertical projection of a geometric center of a display surface of each display unit on the second light transmission substrate does not overlap the corresponding geometric center of the first surface, wherein the second surface of each microlens is off-axis asymmetric relative to the geometric center of the second surface.

2. The near-eye display device according to claim 1, wherein each first surface is convex relative to the second light transmission substrate, and each second surface is concave relative to the second light transmission substrate.

3. The near-eye display device according to claim 1, wherein a connecting line of the geometric center of the first surface of each microlens and a geometric center of the second surface is not parallel to a normal line of the second light transmission substrate.

4. The near-eye display device according to claim 1, wherein there is a first interval between two adjacent first surfaces, a second interval between two adjacent second surfaces, and a third interval between display surfaces of two adjacent display units, and the second interval is greater than the first interval and smaller than the third interval.

5. The near-eye display device according to claim 1, wherein a radius of curvature at the geometric center of the first surface of each microlens is smaller than a radius of curvature at a geometric center of the second surface.

6. The near-eye display device according to claim 1, wherein an area of the first surface of each microlens is greater than or equal to an area of the second surface.

7. The near-eye display device according to claim 1, wherein the first surface of each microlens is circularly symmetrical relative to the geometric center of the first surface.

8. The near-eye display device according to claim 1, further comprising a central microlens, where the central microlens is configured at a symmetry center of an area on the second light transmission substrate where the plurality of microlenses are configured.

9. The near-eye display device according to claim 8, wherein the plurality of microlenses comprise a first microlens, a second microlens, and a third microlens, distances between the first microlens and the second microlens and the central microlens are different, distances between the first lens and the third microlens and the central microlens are the same, a radius of curvature at a geometric center of a first surface of the first microlens is different from a radius of curvature at a geometric center of a first surface of the second microlens, and the radius of curvature at the geometric center of the first surface of the first microlens is the same as the radius of curvature at a geometric center of a first surface of the third microlens.

10. The near-eye display device according to claim 1, wherein an opening angle of two adjacent microlenses relative to an image receiving area is substantially the same as a full field of view angle of each microlens.

11. The near-eye display device according to claim 10, wherein the full field of view angle falls within a range of 2 degrees to 10 degrees.

12. The near-eye display device according to claim 1, wherein the plurality of arrays of display units comprise a plurality of arrays of micro-luminescent elements, each of the micro-luminescent elements is configured to emit an image light beam, and the image light beam penetrates the corresponding optical element and travels towards an image receiving area.

13. The near-eye display device according to claim 1, wherein in the plurality of arrays of optical elements, each of the optical elements has a first curved surface and a second curved surface on two opposite sides, and a geometric center of the first curved surface does not overlap with a geometric center of the second curved surface.

14. The near-eye display device according to claim 1, wherein the plurality of arrays of optical elements are configured to magnify an image projected by the plurality of arrays of display units within a range of 3 to 11.3 times.

* * * * *